(12) United States Patent
Seel et al.

(10) Patent No.: US 6,349,986 B1
(45) Date of Patent: Feb. 26, 2002

(54) CARGO AREA DIVIDER FOR MOTOR VEHICLES

(75) Inventors: Holger Seel, Aidlingen; Werner P. Schlecht, Enz-Aurich, both of (DE)

(73) Assignee: BOS GmbH & Co. KG, Aichwald (DE)

( * ) Notice: Subject to any disclaimer, the term of this patent is extended or adjusted under 35 U.S.C. 154(b) by 0 days.

(21) Appl. No.: 09/670,538

(22) Filed: Sep. 27, 2000

(30) Foreign Application Priority Data

Sep. 28, 1999 (DE) .......................................... 199 46 382

(51) Int. Cl.⁷ ................................................ B60N 3/12
(52) U.S. Cl. .................. 296/37.16; 296/24.1; 296/97.4; 280/748; 280/749; 160/265; 160/310
(58) Field of Search ............................ 296/37.16, 24.1; 280/748, 747; 160/370.32, 265, 201, 310

(56) References Cited

U.S. PATENT DOCUMENTS

| 3,891,263 A | | 6/1975 | Orsulak |
|---|---|---|---|
| 4,342,354 A | * | 8/1982 | Leivenzon et al. .......... 160/310 |
| 4,864,783 A | * | 9/1989 | Esposito ..................... 160/310 |
| 5,203,600 A | | 4/1993 | Watanabe |
| 5,551,726 A | * | 9/1996 | Ament ....................... 296/24.1 |
| 5,632,520 A | * | 5/1997 | Butz ......................... 296/24.1 |
| 5,711,568 A | * | 1/1998 | Diem et al. ................ 296/37.16 |
| 5,820,187 A | * | 10/1998 | Ament et al. ............... 296/24.1 |
| 5,954,380 A | * | 9/1999 | Ament et al. ............... 296/24.1 |
| 5,961,172 A | * | 10/1999 | Ament et al. .............. 296/37.16 |
| 5,971,433 A | * | 10/1999 | Ament et al. ................ 280/749 |
| 6,099,222 A | * | 8/2000 | Moore ...................... 296/37.16 |
| 6,125,907 A | * | 10/2000 | Tokuyama et al. .......... 160/310 |
| 6,125,908 A | * | 10/2000 | Ament et al. ........... 160/370.22 |
| 6,201,364 B1 | * | 3/2001 | Will et al. ................... 166/310 |

FOREIGN PATENT DOCUMENTS

| DE | 19650768 | 6/1998 |
|---|---|---|
| DE | 19811886 | 9/1999 |
| GB | 2334488 | 8/1999 |

OTHER PUBLICATIONS

Copy of the International Search Report.

* cited by examiner

Primary Examiner—Joseph D. Pape
Assistant Examiner—Kiran B. Patel
(74) Attorney, Agent, or Firm—Crowell & Moring LLP

(57) ABSTRACT

A cargo area divider for a vehicle is provided which can be automatically transferred into an operative position or a non-operative position by a motor drive. Monitors for locking mechanisms of the operative position serve to dynamically block a roller blind shaft for the divider. Also, it is provided to monitor a loading level of the cargo area and to trigger an automatic transfer of a divider net or a partition wall into the operating position in response to the loading level exceeding a predetermined amount.

28 Claims, 3 Drawing Sheets

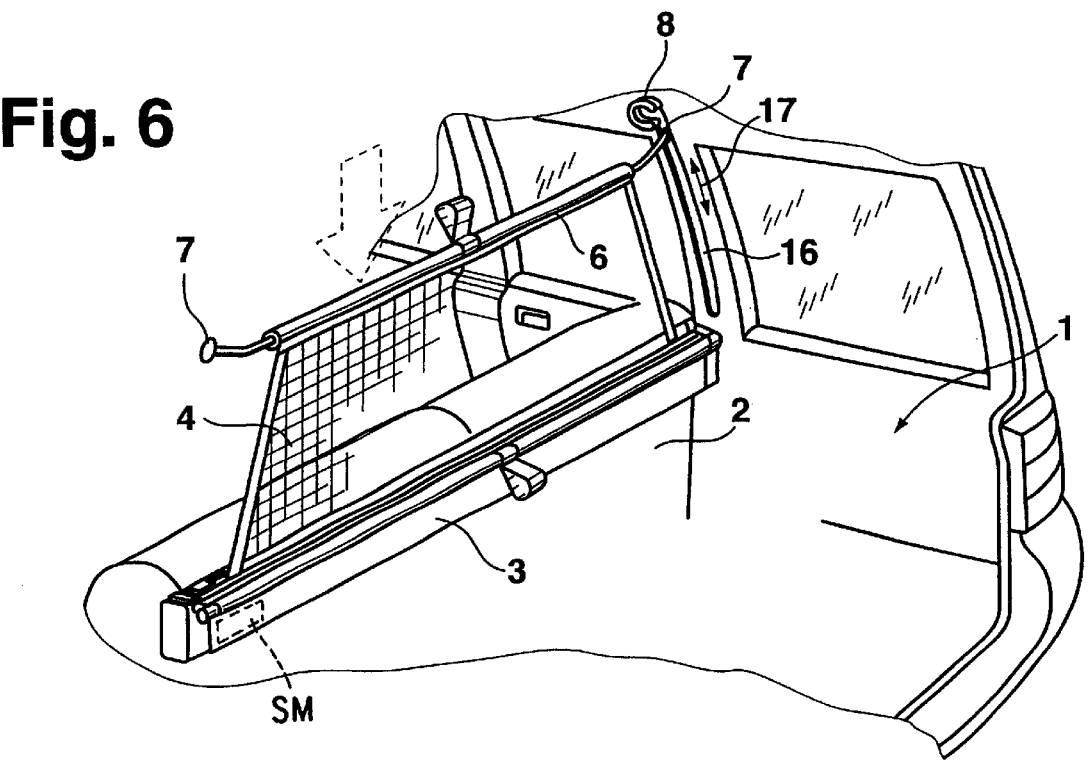
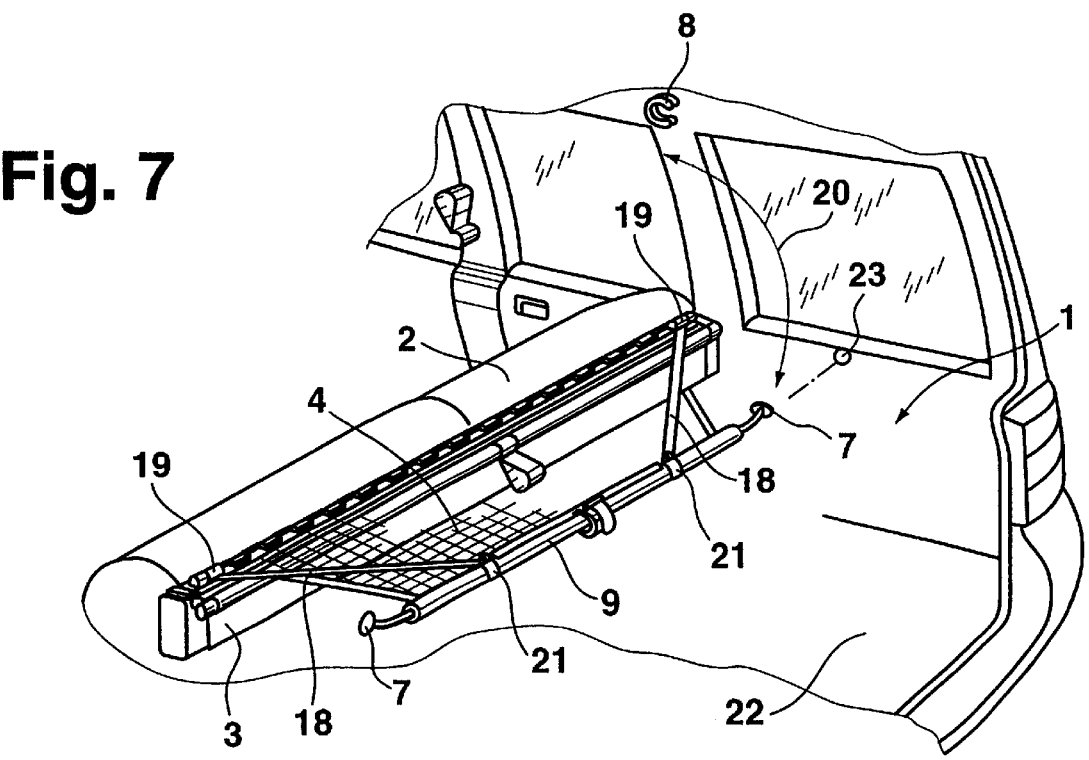

CARGO AREA DIVIDER FOR MOTOR VEHICLES

BACKGROUND AND SUMMARY OF THE INVENTION

This application claims the priority of German patent document 199 46 382.4, filed Sep. 28, 1999, the disclosure of which is expressly incorporated by reference herein.

The present invention relates to a cargo area divider for motor vehicles having a planar structure a first end of which is mounted in an area of an upper edge of backrests of rear seats and a second end of which is anchored, in an operative position, in an area of a headliner, while in a non-operative position it lies behind the backrest.

Cargo area dividers of this kind are commonly known in connection with station wagons, in the form of pull-out retaining nets which are wound up, in the non-operative position, and accommodated in a cassette from which it can be pulled out in upward direction in order to be hooked into corresponding retaining elements in the area of the headliner where they are safely anchored. Given the fact that these divider nets are intended to perform their function also when, for example, the backrests of the rear seats are folded down toward the front, the nets can be pulled out from their respective cassette far enough to bridge the distance between the headliner and the folded-down backrest as well. In order to ensure with such embodiments that the nets will be prevented with sufficient security from being pulled out a further distance when it is desired that the nets should extend only from the upper edge of the backrests, in there upright condition, up to the headliner, holding means are normally provided that engage the meshes of the net in the way of a toothing and that are arranged in the area of the pull-out slot of the cassette so as to secure the fixed position of a divider net that has not been fully unwound from its winding-up shaft.

It is an object of the present invention to considerably facilitate the operation of a cargo area divider of the kind described above.

This object is achieved, with a cargo area divider of the before-mentioned kind, in that a servomotor is provided as a drive by which the second end of the planar structure can be moved from its non-operative position into its operative position, or vice versa.

According to a further development of preferred embodiments of the invention, the second end may be provided with coupling elements that coact, in the operative position, with vehicle-mounted retainers so as to fix the structure in that position via locking structure. In the case of this embodiment, it is only necessary to trigger an actuating switch whereby the cargo area divider is automatically moved into, and arrested in its operative position.

According to a further development of preferred embodiments of the invention, a sensor may be provided for monitoring the locking function in the operative position, which sensor may be designed as a limit switch actuated by at least one coupling element.

According to a further development of preferred embodiments of the invention, a sensor may be additionally provided for monitoring the loading level, which sensor activates the drive when a certain loading level is exceeded. In the case of such an embodiment, therefore, the drive is automatically activated to mount the cargo area divider when the luggage compartment, for example of a station wagon, is loaded to an extent that at least one of the pieces of luggage comes to occupy a position at the level of the backrests of the front seats. In such a case there would be the risk for the respective piece of luggage to slide forward and into the area of the passenger compartment, and to cause injury or damage if the vehicle should be braked. This embodiment, therefore, eliminates the need for the driver to operate a switch, and guarantees that the cargo area divider is positioned automatically.

According to a further development of preferred embodiments of the invention it is, however, also contemplated to provide monitoring devices that cause the planar structure to be moved abruptly into its operative position in case of a crash. Such monitoring devices may be connected with a pyrotechnical drive, or with a drive in the form of a spring energy store, so that—as in the case of headrests in cabriolets—it will always be ensured that the luggage will be prevented from being thrown into the passenger compartment even in cases where the cargo area divider had not been brought into its operative position because of the low loading level of the trunk, in any case however in case of accident.

According to a further development of preferred embodiments of the invention, it may be provided for a cargo area divider, which has the planar structure configured as a divider net and where the second end of the net is equipped with a full-length guide bar, that the two ends of the guide bar are guided respectively in a groove in a side wall of the vehicle body and that the drive for moving the planar structure is associated to that groove.

However, it is also contemplated by certain preferred embodiments of the invention, in the case of a cargo area divider where the planar structure can be wound up in a cassette, to associate the drive for the planar structure with the cassette, in which case the drive can be configured in known fashion as a pivoting lever arrangement by which the planar structure is pushed in upward direction.

According to a further development of preferred embodiments of the invention, the planar structure may, however, also be configured as a solid partition wall, hinged on the backrest, in which case the drive is associated to a mount for the partition wall and can be removed together with the latter.

For all these embodiments, using either a cassette with a wound-up divider net or a removable mount for a hinged partition wall, it is advantageous according to a further development of the invention if the connections for the power supply for the drive are configured as plug connections that are simply plugged in as the cargo area divider is mounted.

It has been mentioned before that when the cargo area divider is configured as a safety net that can be wound up and that can be pulled out further when the backrests are folded down, locking structure must be provided for the net when it occupies its operative position with the backrests in upright position.

According to a further development of preferred embodiments of the invention it is now possible, since a sensor can be provided for monitoring the locked position of the divider net, to provide also for dynamic locking of the roller blind shaft of the divider net in its locked and secured operative position so that the usual toothing engaging the meshes of the net need not be provided. The roller blind shaft as such can be blocked in this case in the known way when it receives a signal from the before-mentioned sensor that the divider net has been firmly and sufficiently fixed at its upper mounting points.

According to a further development of preferred embodiments of the invention, it can finally be provided that the divider net will be displaced, with the aid of the drive, only by a fraction of its overall pull-out length and that the remaining pull-out movement can be performed manually through insertion of a free-wheeling mechanism. This configuration permits the movement of the divider net to be driven automatically when the backrests of the station wagon occupy their upright position, which is the normal case. In this case, only the space between the upper edge of the backrest and the headlining of the vehicle must be bridged. In the different case, which will occur less often, automatic displacement of the divider net is not provided. In this case it is then possible, according to a further development of the invention, to provide that the second end of the divider net is detachably connected to an adjusting element operated by the drive. The second end of the divider net can then be detached and positioned manually.

Other objects, advantages and novel features of the present invention will become apparent from the following detailed description of the invention when considered in conjunction with the accompanying drawings.

BRIEF DESCRIPTION OF THE DRAWINGS

FIG. 6 shows a perspective partial view of a cargo area or trunk similar to FIG. 1, but for a different embodiment of the drive of the cargo area divider; and FIG. 7 shows further variants of a cargo area divider according to the invention, in a representation similar to FIG. 1.

DETAILED DESCRIPTION OF THE DRAWINGS

Figure 1:
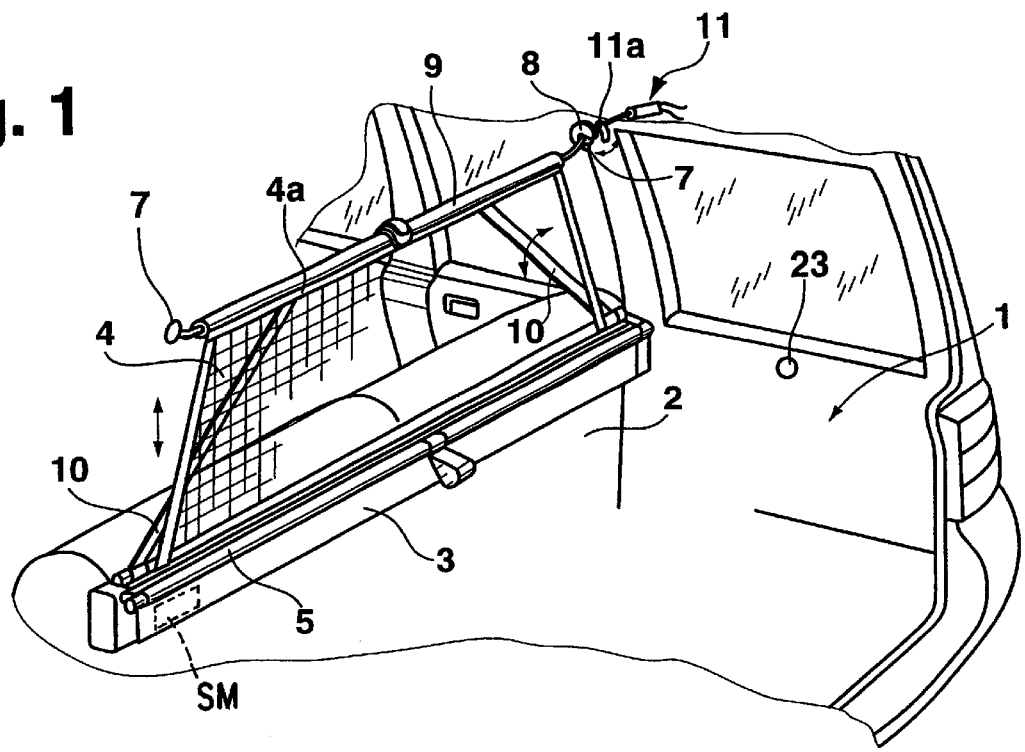
FIG. 1 shows a perspective partial view of a cargo area of a vehicle designed as a station wagon, with a cargo area divider according to the invention in the pulled-out condition.

In FIG. 1, the cargo area or trunk 1 of a station wagon—not shown in detail—can be seen, which is delimited against a front passenger compartment by the upright backrests 2 of the rear seats. In the area of the upper edge of the backrests 2, there is mounted in a manner known as such an elongated cassette 3 which in the non-operative position—not shown—accommodates a divider net which occupies its operative position in the representation of FIG. 4. In addition, the cassette 3 is provided with a cargo area cover 5, which is wound up in the representation of FIG. 1 and which, therefore, does not cover the cargo space.

Inside the cassette 3 the divider net 4 is mounted by its first end—in a manner not shown in detail—on a roller blind shaft, that may for example be dynamically blocked in the illustrated position of the divider net 4, which arrangement will however be described in more detail further below. The second end 4a of the divider net 4 is fixed in the form a loop on a full-length guide bar 6 the two ends of which are provided in the illustrated embodiment with coupling elements 7 of hammer head-like shape that are mounted on the vehicle body in retainers 8 in the area of the headliner—not shown—and are suitably designed for mechanically holding the coupling elements 7 in the illustrated operative position of the divider net 4. As can be seen more clearly in FIG. 2, the guide bar 6 is detachably connected with a bar-like holder 9 being part of a drive that serves to move the divider net by means of a servomotor SM from a non-operative position in which it is accommodated inside the cassette 3 into the operative position shown in FIG. 1.

The holder 9 is connected for this purpose with two swinging arms 10 that are pivoted by their lower ends on the cassette 3 and are connected with a servomotor SM—in a manner not shown in detail—by a gear mechanism or the like in a manner such that they can be moved from a position in which they are approximately aligned with the upper edge of the cassette 3 into their upper position shown in FIG. 1. The upper ends of the swinging arms 10 are seated on sliding members 110 that can move in the longitudinal direction of the holder 9 during that swinging operation. The two swinging arms 10 are therefore capable of transferring the holder 9 from its position in which it rests on the cassette 3 into the position shown in FIG. 1 in which the divider net occupies its operative position.

In the operative position, the coupling elements 7 are retained in their retainers 8 and are mechanically locked in them in such a way that when a load acts on the divider net 4 from the cargo area 1 in forward direction, toward the passenger compartment, the divider net 4 will be retained firmly on the headliner so as to protect the passenger compartment. If it is not desired to provide the usual blocking arrangement using teeth provided on the upper edge of the cassette 3 that engage into the meshes of the net 4, the first end of the divider net 4, which is fixed on a roller blind shaft in the cassette 3, can be retained in place by a dynamic blocking arrangement for the roller blind shaft, which will become active when a sensor 11 signals that the coupling elements 7 have properly entered the retainers 8 and have been locked in the latter. The sensor 11 may consist of a limit switch 11a associated with the retainer 8, which emits a signal when the coupling elements 7 properly enter the retainers 8, which signal actuates the blocking arrangement for the roller blind shaft inside the cassette 3.

Since in the illustrated embodiment the cassette 3 is removably mounted on the backrests 2—as known as such—the energy supply for the servomotor SM—not shown—for moving the swinging arms 10 must of course be realised via plug-in connectors comprising an easy to operate plug mounted on the cassette 3 that coacts with a socket provided on the vehicle body. The signal arriving from the sensor 11 may then also be supplied via that plug-in connection to the cassette 3 for the purpose of blocking the roller blind shaft.

In order to permit positioning of the divider net 4 in the illustrated embodiment even when the backrests 2 have been folded down to the front, the divider net 4 can be pulled out from the cassette 3—in a manner generally known—a distance further than that shown in FIG. 1.

In the illustrated embodiment, the drive comprising the servomotor and the pivoting lever 10 is sufficiently sized to permit the divider net 4 and/or its coupling elements 7 to be introduced into the retainers 8 when the backrests 2 occupy the position illustrated in FIG. 1, so as to permit a cargo area divider to be automatically put in place. However, when the backrests are folded down, it will be necessary to guide the divider net manually into the further retainer elements in the area of the headliner in order to ensure that the two front seats are also separated from the remaining cargo area.

Figure 2:
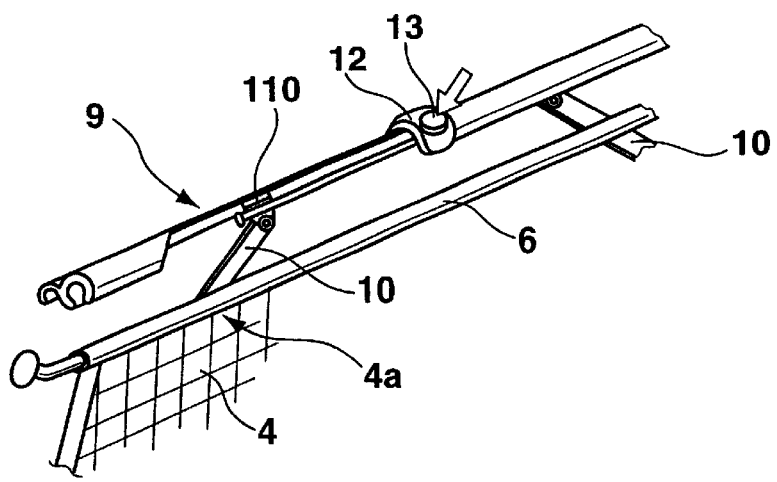
FIG. 2 shows an enlarged detail illustration of the area of the upper end of the cargo area divider according to FIG. 1.
Figure 3:
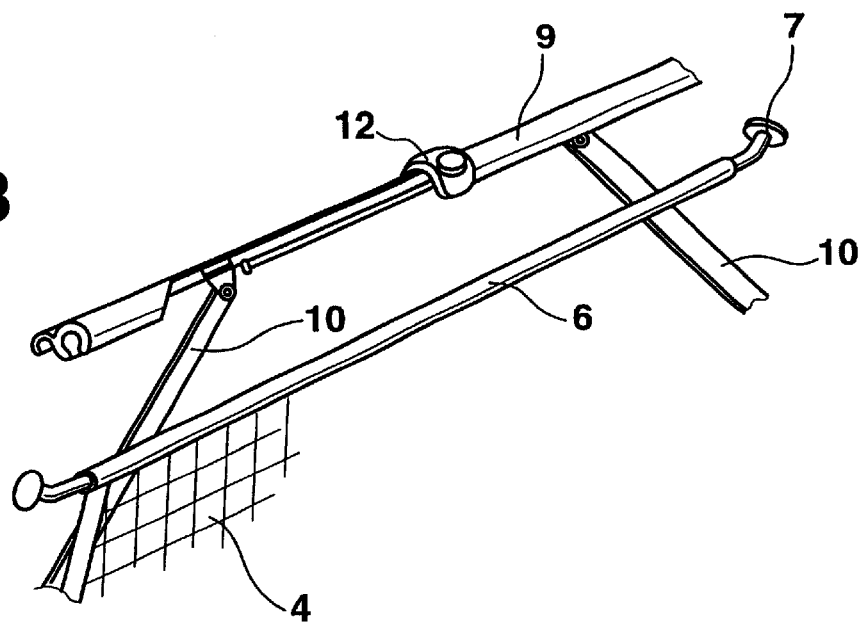
FIG. 3 shows a view similar to that of FIG. 2, but with the divider net fully removed from the lever system according to FIG. 2.

According to FIGS. 2 and 3 it is provided for this purpose that the guide bar 6 of the divider net 4 can be detached from the holder 9. To this end, a lock 12 may be provided for example with an actuating button 13 by means of which the guide bar 6, together with the divider net 4, can be removed from the holder 9 in downward direction. The guide bar 6 so released can then be pulled upward manually in the known way. The roller blind shaft is not blocked in this condition, as has been set out before.

Figure 4:
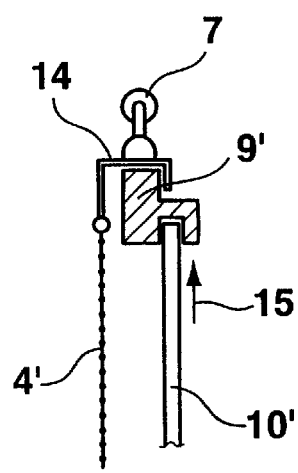
FIG. 4 shows a diagrammatic representation of the interaction between the drive of the cargo area divider and the divider net similar to FIG. 2, but for a different embodiment.
Figure 5:
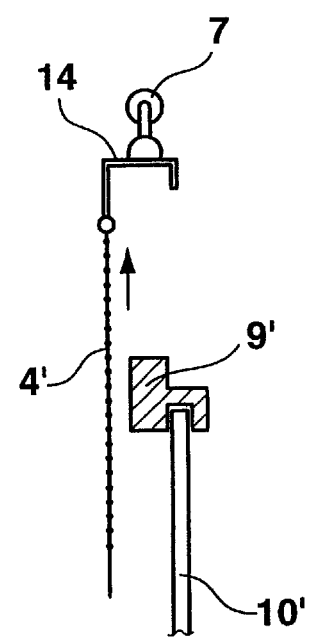
FIG. 5 shows the drive as implemented in FIG. 4, but with the divider net removed.

FIGS. 4 and 5 show schematically the arrangement by which the divider net, designated by 4' in FIGS. 4 and 5, can be detached from the drive (here: 10') and the holder (here: 9'). Contrary to FIGS. 2 and 3, the divider net 4' coacts to this end with a holder 14 in the form of an angle, which can be applied over the edge of the holder 9' so that the divider net 4' can be moved, in the direction indicated by arrow 15, from the holder 9' above the drive 10' and upward into the operative position.

When the divider net 4' is to be taken down, then the holder 14 carrying the coupling elements 7 or a corresponding guide bar provided with individual hooks in the form shown for the holder 14, only have to be lifted off the holder 9' and to be engaged manually into the respective retainers, when the backrests have been folded down to the front.

FIG. 6 shows a variant of a cargo area divider according to the invention. In this case, a groove 16, guiding the coupling elements 7 and extending up to a retainer 8 for coupling elements 7 in the guide bar 6 of the divider net 4, is provided on the side walls of the cargo area or the trunk 1 and in the area of the backrests 2 of the rear seats in the side walls of the vehicle body. Arranged in this groove is a drive mechanism—not shown in detail which acts via a servomotor to move a drive member in the direction indicated by arrows 17 and which guides the coupling elements 7 in the groove 16. The coupling elements 7 are thereby guided in the groove 16 from a non-operative position in which they are positioned in the area of the lower end of the groove 16 into an operative position in which they are received and locked in the retainers 8 in the manner described above in connection with FIG. 1. In the case of this embodiment, where the cassette 3 does not itself contain the drive for the divider net 4, it is therefore not necessary to provide plug-in connections for the drive on the cassette 3. It merely has to be ensured that after the cassette 3 has been mounted on the backrests 2 the coupling elements 7 can be introduced into the groove 16 so that they establish contact with their drive member in the groove. Introducing the coupling elements, which may have a hammer head-like shape in this case as well, may be effected for example through an enlargement in the form of a keyhole at the lower end of the groove 16.

FIG. 7 finally shows a further variant where two swinging levers 18 are connected with the holder 9 for the divider net 4, but are retained in bearings 19 by an axis extending parallel to the upper edge of the backrests, and are connected with a drive associated to the cassette 3—not shown in detail—so that they can be pivoted about the axis defined by the bearings 19 in the direction indicated by arrows 20. The swinging arms 18 are in this case firmly connected with the holder 9, for example by clips 21, and can be moved from the operative position—not shown—in which the coupling elements 7 are again engaged and locked in the retainers 8 into the position shown in FIG. 7, i.e. the non-operative position in which the divider net 4 extends approximately parallel to the floor 22 of the cargo area or the trunk 1, or else into a position—this is even more favourable—in which the divider net 4 extends approximately parallel to and is in contact with the rear surface of the backrests 2.

Since in this case the drive for the swinging arms is again associated to the cassette 3, the energy supply for the servomotor of the drive must again be effected via plug-in connections.

It is also contemplated according to certain preferred embodiments of the invention that have not been described above, to configure the divider net 4, which may also take the form of a non-flexible wall in the case shown in FIG. 7, with an additional emergency drive that will become active only in case of a crash and that will bring the cargo area divider abruptly into its operative position if not already occupied by it.

This can be achieved by a pyrotechnical drive, as already known, for example, from cabriolet rollover bars. However, it is also be contemplated to provide a spring energy store which—similar to the control of an airbag—would be triggered by a sensor in case of a crash. Further, it is also contemplated with all described embodiments to provide a sensor, for example in the form of a light barrier 23, which would be arranged laterally in the cargo area 1, approximately at the level of the upper edges of the backrests 2. The sensor would then detect whether or not the trunk 1 has been loaded up to its level. If, therefore, the sensor 23 were mounted at a level up to which all pieces of luggage or cargo are still safely below the upper edge of the backrest 2, the sensor 23 would not emit any signal for the drive of the cargo area divider. If, however, the trunk were loaded beyond the level monitored by the sensor 23, then the signal emitted by the sensor would cause the drive for the cargo area divider, i.e. for the divider net 4 or the hinged wall according to FIG. 7, to be triggered and the cargo area divider to be brought into its operative position. In case of overloading of the vehicle, this embodiment therefore automatically guarantees that the passenger compartment is safely separated from the cargo area or trunk 1. In all cases, however, it is possible to provide for an automatic adjustment of the cargo area divider which has the effect to further simplify its operation and, as has been shown, to improve safety.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cargo area divider assembly for motor vehicles comprising:
    a planar structure, a first end of which is mounted in use in an area of an upper edge of backrests of rear seats and a second end of which is anchored, in an operative position, in an area of a headliner, while in a non-operative position the planar structure lies behind the backrest, and
    a servomotor provided as a drive by which the second end of the planar structure can be moved between the non-operative position and the operative position,
    wherein the second end is provided with coupling elements that coact, in the operative position, with vehicle-mounted retainers so as to fix the arrangement in that position via locking structure, and
    wherein a sensor is provided for monitoring the locking function of the locking structure in the operative position.

2. Cargo area divider assembly according to claim 1, wherein the sensor is designed as a limit switch actuated by at least one coupling element.

3. Cargo area divider assembly according to claim 1,
    wherein the planar structure is a divider net wound on a roller blind shaft, and
    wherein the roller blind shaft of the divider net is dynamically blocked in its locked and secured operative position.

4. Cargo area divider assembly according to claim 1, wherein a monitor is provided that causes the planar structure to be moved abruptly into its operative position in case of a crash.

5. Cargo area divider assembly according to claim 4, wherein the monitor triggers a pyrotechnical drive or a drive in the form of a spring energy store.

6. Cargo area divider assembly according to claim 1, which has the planar structure configured as a divider net,
    wherein the second end is equipped wit h a full-length guide bar,
    wherein the two ends of the guide bar are guided respectively in a groove in a side wall of the vehicle body, and
    wherein the drive for moving the planar structure is associated with that groove.

7. Cargo area divider assembly according to claim 6, wherein the planar structure can be wound up in a cassette, and
    wherein the drive for the planar structure is associated with the cassette.

8. Cargo area divider assembly according to claim 7, wherein the drive is configured as a drive for swinging levers.

9. Cargo area divider assembly according to claim 7, wherein connections for power supply for the drive are configured as plug connections.

10. Cargo area divider assembly according to claim 9, wherein connections for power supply for the drive are configured as plug connections.

11. Cargo area divider assembly according to claim 7,
    wherein the planar structure is a divider net wound on a roller blind shaft, and
    wherein the roller blind shaft of the divider net is dynamically blocked in its locked and secured operative position.

12. Cargo area divider assembly according to claim 7, wherein the planar structure is a divider net, and wherein the length by which the divider net is displaced by the drive is only part of the overall pull-out length and the remaining pull-out movement can be performed manually through insertion of a free-wheeling mechanism.

13. Cargo area divider assembly according to claim 12, wherein a second end of the divider net is detachably connected to an adjusting element operated by the drive.

14. Cargo area divider assembly according to claim 1, wherein the planar structure is configured as a solid partition wall which is hinged on the backrest.

15. Cargo area divider assembly according to claim 14, wherein the drive for the holder is associated with the partition wall and can be removed together with the latter.

16. Cargo area divider assembly for motor vehicles comprising:
    a planar structure, a first end of which is mounted in use in an area of an upper edge of backrests of rear seats and a second end of which is anchored, in an operative position, in an area of a headliner, while in a non-operative position the planar structure lies behind the backrest, and
    a servomotor provided as a drive by which the second end of the planar structure can be moved between the non-operative position and the operative position,
    wherein a sensor is provided for monitoring the loading level, which sensor activates the drive when a certain loading level is exceeded.

17. Cargo area divider assembly according to claim 16, wherein the sensor is configured as an optical monitoring unit.

18. Cargo area divider assembly according to claim 16, wherein the planar structure is a divider net, and wherein the length by which the divider net is displaced by the drive is only part of the overall pull-out length and the remaining pull-out movement can be performed manually through insertion of a free-wheeling mechanism.

19. Cargo area divider assembly according to claim 18, wherein a second end of the divider net is detachably connected to an adjusting element operated by the drive.

20. Cargo area divider assembly according to claim 16, wherein the second end is provided with coupling elements that coact, in the operative position, with vehicle-mounted retainers so as to fix the arrangement in that position via locking structure.

21. Cargo area divider assembly according to claim 20, wherein a sensor is provided for monitoring the locking function of the locking structure in the operative position.

22. Cargo area divider assembly according to claim 21, wherein the sensor is designed as a limit switch actuated by at least one coupling element.

23. Cargo area divider assembly according to claim 21, wherein the planar structure is a divider net wound on a roller blind shaft, and wherein the roller blind shaft of the divider net is dynamically blocked in its locked and secured operative position.

24. Cargo area divider assembly according to claim 20, wherein the planar structure is a divider net wound on a roller blind shaft, and wherein the roller blind shaft of the divider net is dynamically blocked in its locked and secured operative position.

25. Cargo area divider assembly for motor vehicles comprising:

a planar structure, a first end of which is mounted in use in an area of an upper edge of backrests of rear seats and a second end of which is anchored, in an operative position, in an area of a headliner, while in a non-operative position the planar structure lies behind the backrest, and a servomotor provided as a drive by which the second end of the planar structure can be moved between the non-operative position and the operative position, wherein the planar structure is a divider net, and the length by which the divider net is displaced by the drive is only part of the overall pull-out length and the remaining pull-out movement can be performed manually through insertion of a free-wheeling mechanism.

26. Cargo area divider assembly according to claim 25, wherein a second end of the divider net is detachably connected to an adjusting element operated by the drive.

27. Cargo area divider assembly according to claim 25, wherein a sensor is provided for monitoring the loading level, which sensor activates the drive w hen a certain loading level is exceeded.

28. Cargo area divider assembly according to claim 27, wherein the sensor is configured as an optical monitoring unit.

* * * * *